(12) United States Patent
Paing et al.

(10) Patent No.: US 7,494,186 B2
(45) Date of Patent: Feb. 24, 2009

(54) FOLDING RECLINER OF SEAT FOR VEHICLES

(75) Inventors: Hyun-Sung Paing, Incheon (KR); Jun-Kyu Park, Daejeon (KR)

(73) Assignee: Austem Co., Ltd., Cheonan-Si (KR)

( * ) Notice: Subject to any disclaimer, the term of this patent is extended or adjusted under 35 U.S.C. 154(b) by 465 days.

(21) Appl. No.: 11/330,953

(22) Filed: Jan. 11, 2006

(65) Prior Publication Data

US 2007/0138854 A1 Jun. 21, 2007

(30) Foreign Application Priority Data

Dec. 21, 2005 (KR) ............... 10-2005-0126770

(51) Int. Cl.
*B60N 2/02* (2006.01)
(52) U.S. Cl. .................. 297/378.12; 297/361.1
(58) Field of Classification Search ............ 297/378.12, 297/378.1, 354.12, 361.1; 16/239, 236
See application file for complete search history.

(56) References Cited

U.S. PATENT DOCUMENTS

| | | | | |
|---|---|---|---|---|
| 4,394,048 A | * | 7/1983 | Sakurai et al. ............... 297/367 |
| 4,591,207 A | * | 5/1986 | Nithammer et al. ......... 297/366 |
| 5,205,609 A | * | 4/1993 | Notta et al. .................. 297/367 |
| 5,788,330 A | * | 8/1998 | Ryan ....................... 297/378.12 |
| 6,328,381 B1 | * | 12/2001 | Smuk ......................... 297/365 |
| 6,616,241 B1 | * | 9/2003 | Masuda et al. ........... 297/463.1 |
| 6,752,461 B2 | * | 6/2004 | Hamelin ................. 297/378.12 |

* cited by examiner

*Primary Examiner*—Milton Nelson, Jr.
(74) *Attorney, Agent, or Firm*—Schmeiser, Olsen & Watts LLP (57) ABSTRACT

Disclosed herein is a folding recliner of a seat for vehicles which is able to execute both seat folding and reclining motions using only a single lever. The folding recliner of the present invention includes a lever unit, which has a lever pin and a lever, so that, when the lever is rotated in a predetermined direction, the lever unit is rotated around a reclining shaft so that the seat back enters an unlocked state. The folding recliner further includes a first link, which has a contact part on a lower end thereof, and a second link, which is rotated around a rotating shaft, coupled to the second link, by movement of the first link. The folding recliner further includes a spring, which is coupled between the second link and a frame unit, and a cam, which is rotated around the rotating shaft and has a locking protrusion. The folding recliner further includes a latch which is rotated around a folding shaft and has a curved edge part, so that the curved edge part contacts an upper end of the cam so that the seat back maintains an unfolded locked state thereof, and a locking notch formed at a predetermined position in the outer edge of the latch so that the locking protrusion of the cam is locked to the locking notch so that the seat back maintains a folded locked state thereof.

4 Claims, 12 Drawing Sheets

FOLDING RECLINER OF SEAT FOR VEHICLES

BACKGROUND OF THE INVENTION

1. Field of the Invention

The present invention relates generally to folding recliners of seats for vehicles and, more particularly, to a folding recliner of a seat for vehicles which is able to execute both seat folding and reclining motions using only a single lever, so that the size of a linking mechanism and the number of elements are reduced, and manufacturing costs thereof are reduced, and in which a latch pin and a stopper link are provided in an arm frame, so that the folding and reclining motions of the seat can be separately executed and, as well, a malfunction in folding or reclining the seat is prevented from being induced.

2. Description of the Related Art

As well known to those skilled in the art, a vehicle seat comprises a seat cushion, which supports the weight of an occupant, and a seat back, which supports the back of the occupant.

Typically, the seat back is rotatably mounted to the seat cushion by a hinge, and the angle of the seat back with respect to the seat cushion can be adjusted according to the intended purpose of the occupant. For this, the seat back should be converted between a locked state, in which the seat back is locked to the seat cushion at a desired angle, and an unlocked state, in which the seat back is rotatable with respect to the seat cushion. To maintain the seat back in any state or convert the seat back, which has been in that state, into another state, a recliner is mounted on the seat.

In particular, a folding recliner of a seat for vehicles is constructed such that a seat back, which supports the back of an occupant, may be rotated forwards and folded onto a seat cushion.

For example, the folding recliner may be applied to a vehicle, such as a 3-door vehicle or a coupe vehicle having no rear passenger doors, so that passengers may easily enter or exit the rear seats of the vehicle. As another example, the folding recliner may be applied to a recreational vehicle (RV). In this case, the folding recliner is mounted to a rear seat, so that, in normal conditions, it allows a passenger to sit on the rear seat. When it is desired to load cargo into the recreational vehicle, the folding recliner allows the seat back to be folded onto the seat cushion such that a space sufficient to load the cargo is defined in a rear portion of the vehicle.

Recently, according to development of industries and increases in leisure time and the number of people who enjoy leisure, recreational vehicles, in which relatively large numbers of people can ride, and which have space sufficient to load cargo, are gaining popularity.

In the arrangement of seats of such a recreational vehicle, first-row seats, including a driver's seat and a passenger seat, are provided at a front position in a passenger compartment. Second-row seats are provided behind the first-row seats. Third-row seats are provided between the second-row seats and a cargo loading space.

Occupants can freely get on or off the first-row seats and the second-row seats through front doors and rear doors, respectively. However, in the case of the third-row seats, because there is no separate door for allowing the occupants to get on or off the third-row seats, the occupants must get on or off the third-row seats through the rear doors. Therefore, to allow the occupants to get on or off the third-row seats through the rear doors, a seat back folding recliner is used in at least one seat of the second-row seats so that the seat can be folded.

Figure 1:
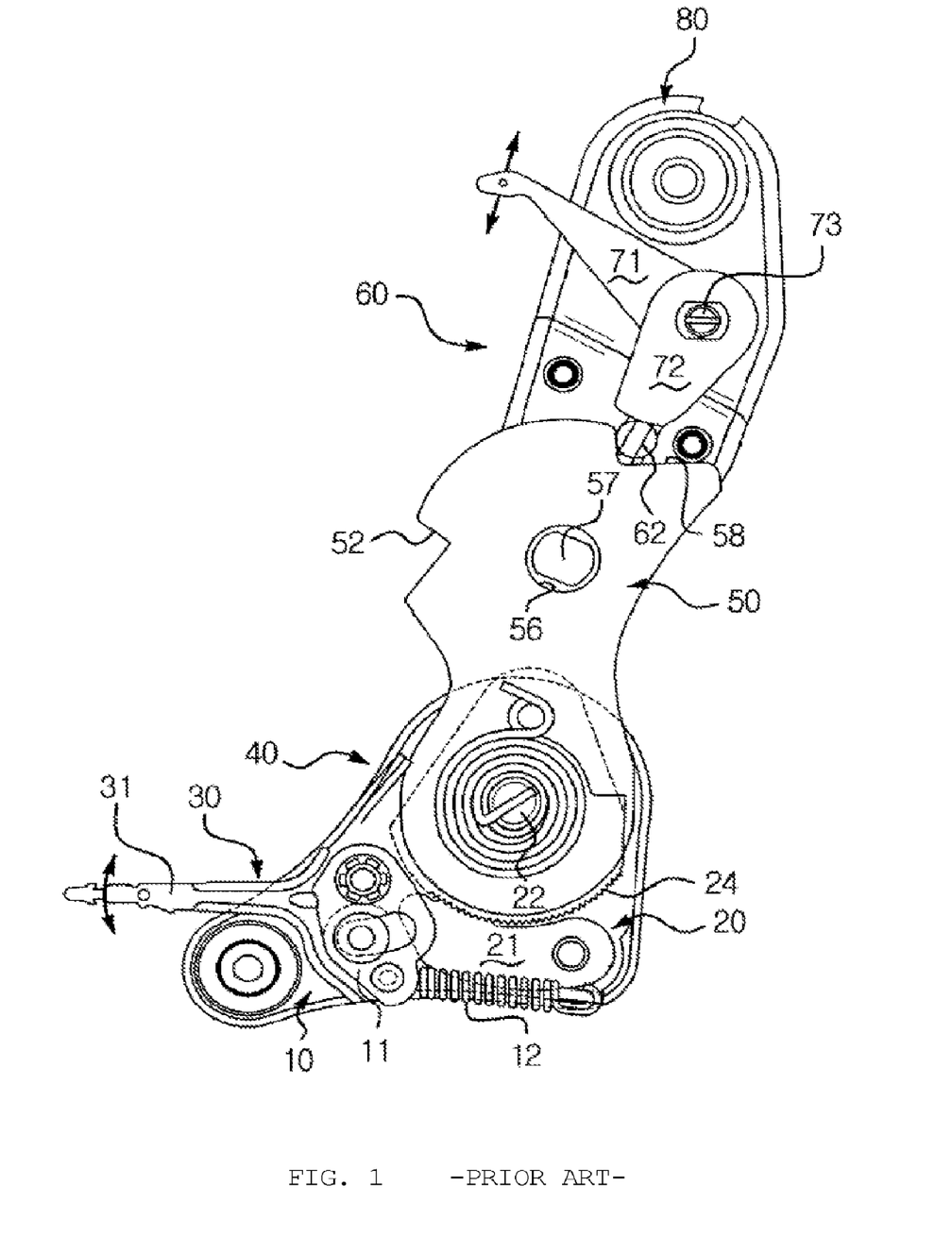
FIG. 1 is a view showing a conventional folding recliner of a seat for vehicles.

FIG. 1 is a view showing the construction of a conventional folding recliner of a seat for vehicles. As shown in FIG. 1, the conventional folding recliner includes a mounting plate 10, which is mounted to a seat frame of the seat. A recliner latch assembly 20 is mounted to the mounting plate 10, and a seat reclining device 40, which allows the seat to enter a reclining state when a lever 31 is manipulated, is provided.

Furthermore, a quadrant 50 is mounted to an upper end of the seat reclining device 40 so as to be rotatable around a hinge pin 22. A seat back latch device 60, which is rotatable around a pivot shaft 57, is mounted to the quadrant 50.

In the seat reclining device 40, when a cam 11 is rotated by the lever 31 in a predetermined direction, lock pawl 21 and teeth 24, which have been engaged with each other, are separated from each other, thus allowing a seat back of the seat to execute a reclining motion. Furthermore, a biasing spring 12 is coupled to an end of the cam 11 such that the lock pawl 21 and the teeth 24 maintain the engaging state using the elasticity of the biasing spring 12.

The seat back latch device 60 allows the seat back to be folded forwards and includes a support plate 80 mounted to the quadrant 50 so as to be rotatable around the pivot shaft 57. Both a lever 71 and a lock cam 72, which are rotated around a pivot pin 73, are mounted to the support plate 80. The lock cam 72 is rotated by manipulation of the lever 71. Thus, when a lock pin 62, which has been placed between the lock cam 72 and a first stop surface 58 of the quadrant 50, is released from the lock cam 72, the support plate 80 is allowed to be rotated so that the seat back can be folded.

In other words, when the lever 71 is rotated upwards, the lock pin 62 is released by a cam 11 and, simultaneously, the lock pin 62 is moved upwards by a connection bracket (not shown), which is coupled to and moved upwards by the lever 71. Then, the support plate 80, that is, the seat back, is allowed to be folded forwards.

Furthermore, in the state in which the seat back is folded forwards, when the lever 71 is rotated downwards, the lock pin 62 is moved downwards and thus is locked between the lock cam 72 and a second stop surface 52 of the quadrant 50.

However, in the above-mentioned structure, in which the lock pin 62 is moved by its weight, there is a problem in that the lock pin 62 may not smoothly move due to friction between a slot and the lock pin 62. Furthermore, the lock pin 62 may fail to unlock, so that the folding motion of the seat back is not executed.

As well, in the convention folding recliner, because the seat back reclining lever 31 and the seat back folding lever 71 are provided on the same side of the seat frame, there is a problem in that malfunction in folding or reclining the seat back is caused, for example, when it is desired to fold the seat back, a user may mistakenly manipulate the reclining lever 31, or, when a reclining motion of the seat back is desired, the user may mistakenly manipulate the folding lever 71.

Moreover, because the reclining lever 31 and the folding lever 71 are provided on the same side of the seat frame, a linking mechanism, which is operated by the levers, is complicated, and the size of the folding recliner is increased. In addition, there are problems in that manufacturing cost and labor cost are increased.

SUMMARY OF THE INVENTION

Accordingly, the present invention has been made keeping in mind the above problems occurring in the prior art, and an object of the present invention is to provide a folding recliner of a seat for vehicles which is able to execute both seat folding and reclining motions using only a single lever, so that the size of a linking mechanism and the number of elements are reduced, and manufacturing costs thereof are reduced, and in which a latch pin and a stopper link are provided in an arm frame, so that the folding and reclining motions of the seat can be separately executed and, as well, a malfunction in folding or reclining the seat is prevented from being induced, and in which arm frames are provided in a frame unit and a latch is provided between the arm frames in a structure such that the latch can be smoothly rotated, so that the folding and reclining motions of the seat back are smoothly executed and, in particular, the folding motion of the seat back can be stably executed, and in which an interlocking cable may be coupled to a lever unit such that folding recliners provided on opposite sides of the seat are operated in conjunction with each other.

In order to accomplish the above object, the present invention provides a folding recliner for folding and reclining a seat back of a seat of a vehicle, including: a lever unit, having a lever pin provided at a predetermined position, and a lever provided at a predetermined position, so that, when the lever is rotated in a predetermined direction, the lever unit is rotated around a reclining shaft using a rotational force transmitted from the lever so that the seat back enters an unlocked state; a first link, with a slot formed through an intermediate portion of the first link so that the first link is moved under guidance of a slot pin inserted into the slot, a contact part provided on a lower end of the first link so that a pushing force for an unlocking motion is transmitted from the lever pin of the lever unit, and a through hole formed through an upper end of the first link; a second link rotated around a rotating shaft, coupled to an intermediate portion of the second link, by movement of the first link, the second link rotatably coupled at a first end thereof to the through hole of the first link using a rotating pin, with a holding hole formed through a second end of the second link; a spring held at a first end thereof by the holding hole of the second link and held at a second end thereof by a frame unit, thus providing a restoring force to the second link so that the seat back enters a locked state; a cam rotated around the rotating shaft and having an arm part extending a predetermined length in a predetermined direction, with a locking protrusion provided on an end of the arm part; and a latch rotated around a folding shaft, with a curved edge part formed at a predetermined position on an outer edge of the latch so that the curved edge part contacts an upper end of the cam such that the seat back maintains an unfolded locked state thereof, and a locking notch formed at a predetermined position in the outer edge of the latch so that the locking protrusion of the cam is locked to the locking notch such that the seat back maintains a folded locked state thereof.

The frame unit may include a main frame to which the lever unit is mounted; a second arm frame provided so as to rotatable around the reclining shaft of the main frame and fitted over the folding shaft, with a guide slot formed at a predetermined position through the second arm frame so that a latch pin coupled to the latch moves along the guide slot; and a first arm frame provided at a position facing the second arm frame.

The folding recliner may further include a stopper link provided on the second arm frame and rotated around the rotating shaft. The stopper link limits movement of the latch pin.

The latch may be fitted over the folding shaft between the first arm frame and the second arm frame and rotated around the folding shaft.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a preferred embodiment of the present invention will be described in detail with reference to the attached drawings.

Figure 2:
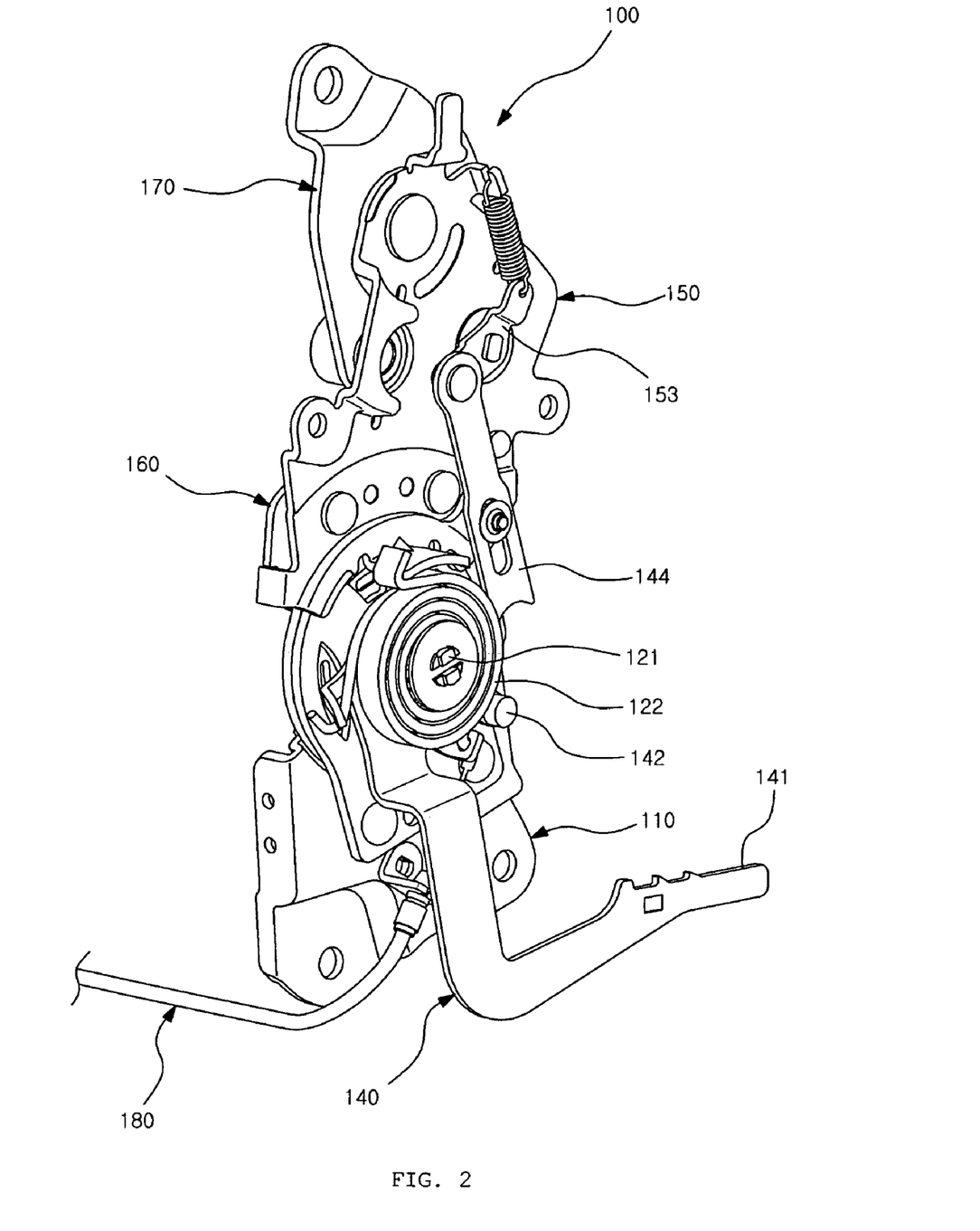
FIG. 2 is a perspective view of a folding recliner of a seat for vehicles, according to an embodiment of the present invention.
Figure 3:
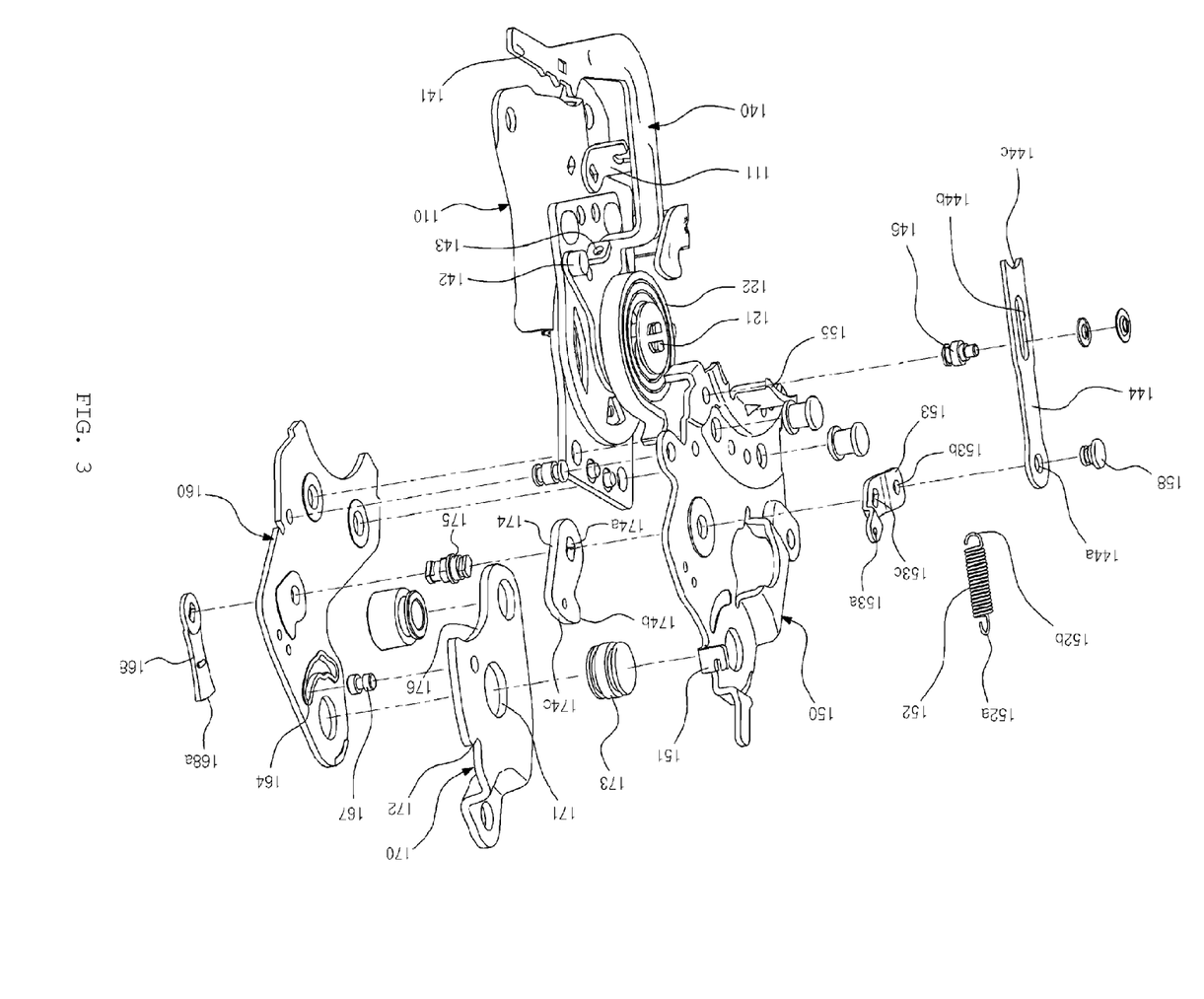
FIG. 3 is an exploded perspective view of the folding recliner of FIG. 2.
Figure 4A:
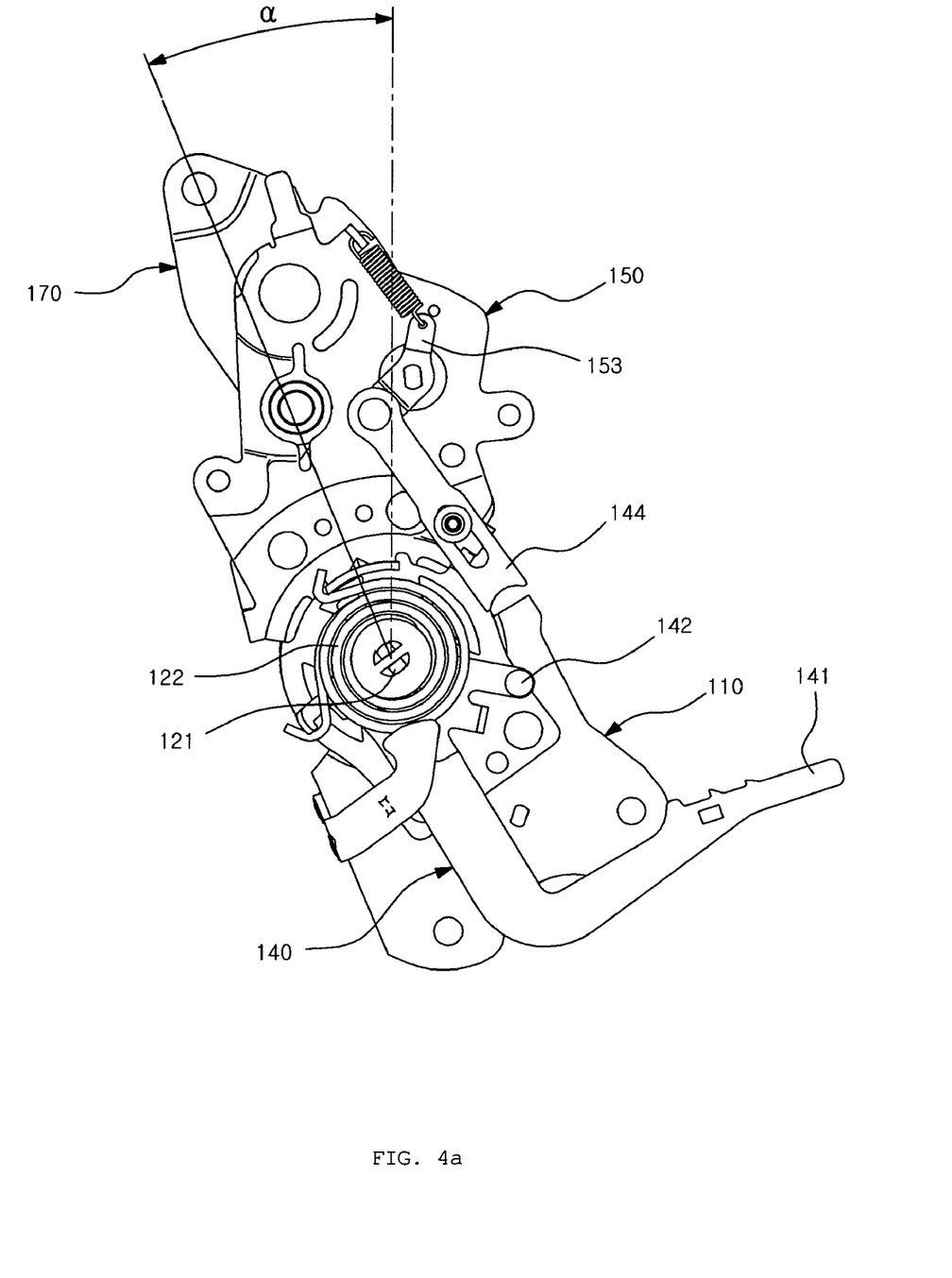
FIGS. 4a through 4c are side views showing a reclining motion of the folding recliner of FIG. 2.
Figure 4B:
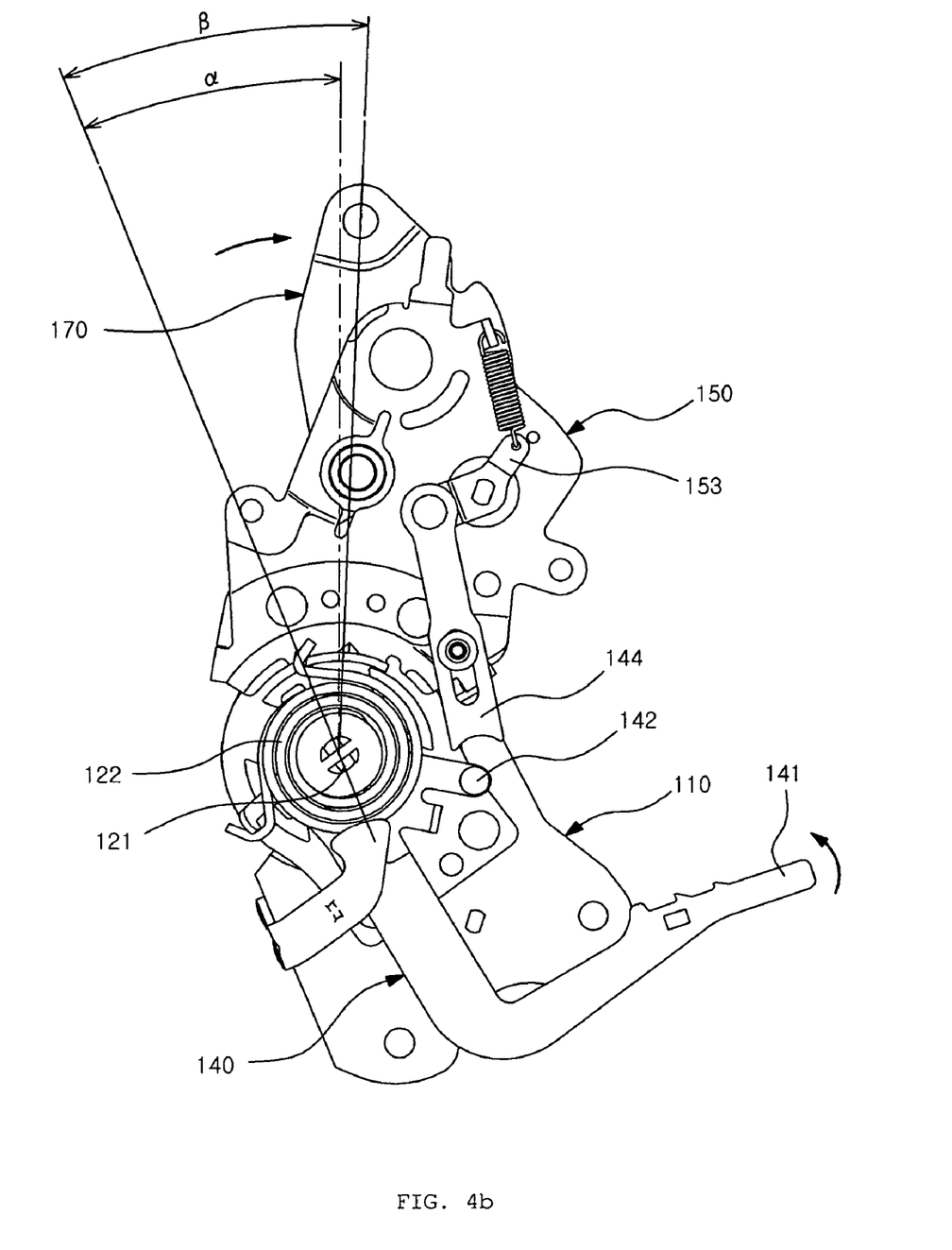
Figure 4C:
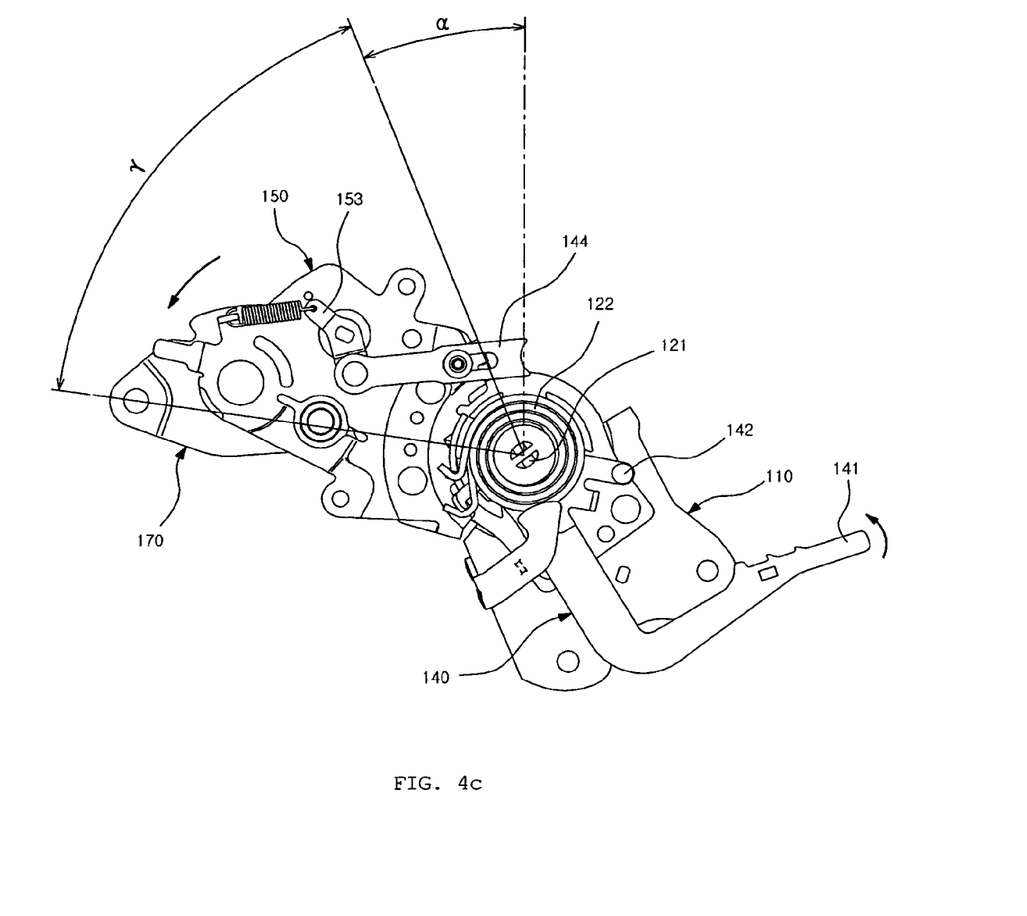

FIG. 2 is a perspective view of a folding recliner of a seat for vehicle, according to the preferred embodiment of the present invention. FIG. 3 is an exploded perspective view of the folding recliner of the present invention. FIGS. 4a through 4c are side views showing a reclining motion of the folding recliner of the present invention. FIGS. 5a through 5d are side views showing a folding motion of the folding recliner of the present invention. FIGS. 6a and 6b are views showing the opposite side of folding recliner of the present invention.

As shown in FIGS. 2 and 3, the folding recliner of a seat for vehicle according to the preferred embodiment of the present invention includes a lever unit 140, a first link 144, a second link 153, a cam 174, a spring 152 and a latch 170.

The lever unit 140 includes a lever pin 142 which has a cylindrical shape and is provided on a protruding part formed at a predetermined position on a first end of the lever unit 140. A lever 141, which has a bent shape and makes it possible for a user to manipulate the folding recliner, is provided on a second end of the lever unit 140. When the lever 141 is rotated by the user in a predetermined direction, the lever unit 140 is rotated around a reclining shaft 121 using the rotational force transmitted from the lever 141, thereby a seat back enters an unlocked state.

The lever unit 140, having the above-mentioned construction, is rotated along with the reclining shaft 121. Furthermore, to allow the lever 141 to reliably move, the lever unit 140 is provided with a coiled torsion spring 122, first and second ends of which are held by the reclining shaft 121 and a frame unit 100, so that the coil spring 122 provides restoring force to the reclining shaft 121 to which the lever 141 is fastened.

As well, a reclining device (not shown) is provided on the reclining shaft 121, such that, when the lever 141 is rotated at a predetermined angle, a reclining motion of the seat back can be executed.

In the case that the folding recliner is mounted to each of opposite sides of the seat, an interlocking cable 180 is preferably coupled to a coupling hole 143 formed in the lever unit 140 of one folding recliner which is provided at a first side of the seat, such that this folding recliner is operated in conjunction with the other folding recliner which is provided at a second side of the seat.

The interlocking cable 180 has a structure in which a wire is covered with a covering so that only the wire moves with respect to the covering. Thus, when the lever 141 is operated, operational force of the lever 141 is transmitted through the wire to the folding recliner disposed at the opposite position.

In detail, an end of the covering of the interlocking cable 180 is held by a holding bracket 111 of the frame unit 100, and the wire of the interlocking cable 180 is coupled to the coupling hole 143 of the lever unit 140.

Therefore, when the lever 141 of the folding recliner, which is provided at the first side of the seat, is operated, the other folding recliner, which is provided at the second side of the seat, can be operated in conjunction with the folding recliner at the first side of the seat, thus allowing a seat back of the seat to stably execute a folding or reclining motion.

Meanwhile, a slot 144b is formed at an intermediate position through the first link 144 in a longitudinal direction. A slot pin 146 is inserted into the slot 144b so as to be slidable along the slot 144b. Therefore, the first link 144 is moved under guidance of the slot pin 146, which is inserted into the slot 144b formed through the intermediate portion of the first link 144.

Furthermore, the first link 144 has on a lower end thereof a contact part 144c, which has a concave shape and is pushed by the cylindrical lever pin 142 of the lever unit 140 such that the folding recliner enters an unlocked state. A through hole 144a is formed at an upper end through the first link 144.

The second link 153 is rotated by movement of the first link 144 around a rotating shaft 175 which is coupled to an intermediate portion of the second link 153. A first end 153b of the second link 153 is rotatably coupled to the through hole 144a of the upper end of the first link 144 using a rotating pin 158. A holding hole 153a is formed through a second end of the second link 153.

The spring 152 is held at a first end 152b thereof by the holding hole 153a of the second link 153 and held at a second end 152a by a holding hole 151 of the frame unit 100. Thus, the spring 152 provides restoring force to the second link 153 such that the recliner enters a folded locked state.

It is preferable that a tension spring, the opposite ends of which have hook shapes such that they can be easily hooked to desired portions, can be used as the spring 152, so that elastic force is applied between the second link 153 and the frame unit 100.

The cam 174 has a fastening hole 174a at a predetermined position. The rotating shaft 175, to which the second link 153 is coupled, is fitted into the fastening hole 174a of the cam 174, so that the cam 174 is rotated along with the second link 153 around the rotating shaft 175. Thus, the elastic force of the spring 152 is applied to the cam 174 as well as the second link 153. Furthermore, an arm part extends from a predetermined position of the cam 174. A locking protrusion 174b is provided on an end of the arm part.

The latch 170, having a coupling hole 171 at its center, is rotatably mounted to the frame unit 100 using a folding shaft 173 at the coupling hole 171. A curved edge part 176 is formed at a predetermined position on an outer edge of the latch 170, so that the curved edge part 176 contacts an upper end 174c of the cam 174 such that the seat back maintains an unfolded locked state thereof. A locking notch 172 is formed at a predetermined position in the outer edge of the latch 170, so that the locking protrusion 174b of the cam 174 is locked to the locking notch 172 such that the seat back maintains a folded locked state thereof.

Furthermore, mounting holes are formed through respective opposite ends of the latch 170, so that the latch 170 is mounted to the seat back through the mounting holes. Thus, the seat back is folded by rotation of the latch 170 around the folding shaft 173.

The frame unit 100 includes a main frame 110, a first arm frame 150 and a second arm frame 160. The frame unit 100 is fastened to a seat frame and supports the seat back.

In detail, the main fame 110 is fastened at a lower end thereof to the seat frame. Both the lever unit 140 and the reclining device are provided on the reclining shaft 121, so that, when the lever 141 is manipulated, the reclining motion of the seat back is executed.

The second arm frame 160 is provided so as to be rotatable around the reclining shaft 121 of the main frame 110. A latch pin 167 and the folding shaft 173 are provided in the second arm frame 160. A guide slot 164, having a curved shape, is formed through the second arm frame 160 to guide movement of the latch pin 167.

Furthermore, a stopper link 168, which is locked to and rotated around the rotating shaft 175 and has a stopper 168a that limits movement of the latch pin 167, is provided on the second arm frame 160.

The stopper 168a of the stopper link 168 has a curved upper edge. Even when the stopper link 168 is rotated by rotation of the rotating shaft 175 by the operation of the lever 141, rotation of the latch 170 is limited while the curved edge of the stopper 168a supports the latch pin 167.

The first arm frame 150 is provided at a position facing the second arm frame 160 so as to be rotatable around the reclining shaft 121 of the main frame 110. Furthermore, a support protrusion 155, which supports the second end of the coiled torsion spring 122, the first end of which is fastened to the reclining shaft 121, is provided on a lower end of the first arm frame 150. Therefore, when the reclining device is unlocked by manipulation of the lever 141, the first arm frame 150 is rotated forwards within a predetermined angular range by the elasticity of the coiled torsion spring 122.

As well, the folding shaft 173 is coupled to both the first arm frame 150 and the second arm frame 160, and the latch 170 is rotatably fitted over the folding shaft 173 between the first arm frame 150 and the second arm frame 160.

The reclining operation of the folding recliner according to this embodiment will be explained in detail with reference to FIGS. 4a through 4c.

As shown in FIG. 4a, typically, the folding recliner of the present invention is used in a state in which the latch 170 is rotated backwards around the reclining shaft 121 at an angle of approximately α based on a reference line (a dashed line). It is preferable that the angle α, at which the latch 170 maintains the state of being rotated, be approximately 23.4°.

In this state, as shown in FIG. 4b, when the lever 141 is rotated upwards at a predetermined angle around the reclining shaft 121 at a predetermined angle, the reclining device is unlocked, so that the first arm frame 150 is rotated forwards by the coiled torsion spring 122 at a predetermined angle β. At this time, it is preferable that the angle β, at which the first arm frame 150 is rotated, be approximately 24°.

As shown in FIG. 4c, in the state in which the lever 141 is rotated upwards at the predetermined angle, the user can rotate the seat back backwards to a predetermined angle α+γ based on the reference line (the dashed line) using his/her back or hands. Here, it is preferable that the angle α+γ, at which the seat back is allowed to be rotated, be approximately 83.4°.

As such, when the lever 141 is rotated at the predetermined angle, only the reclining motion is allowed to be executed, but a folding motion is not allowed.

The folding operation of the folding recliner according to this embodiment will be described with reference to FIGS. 5a through 5d and FIGS. 6a and 6b.

Figure 5A:
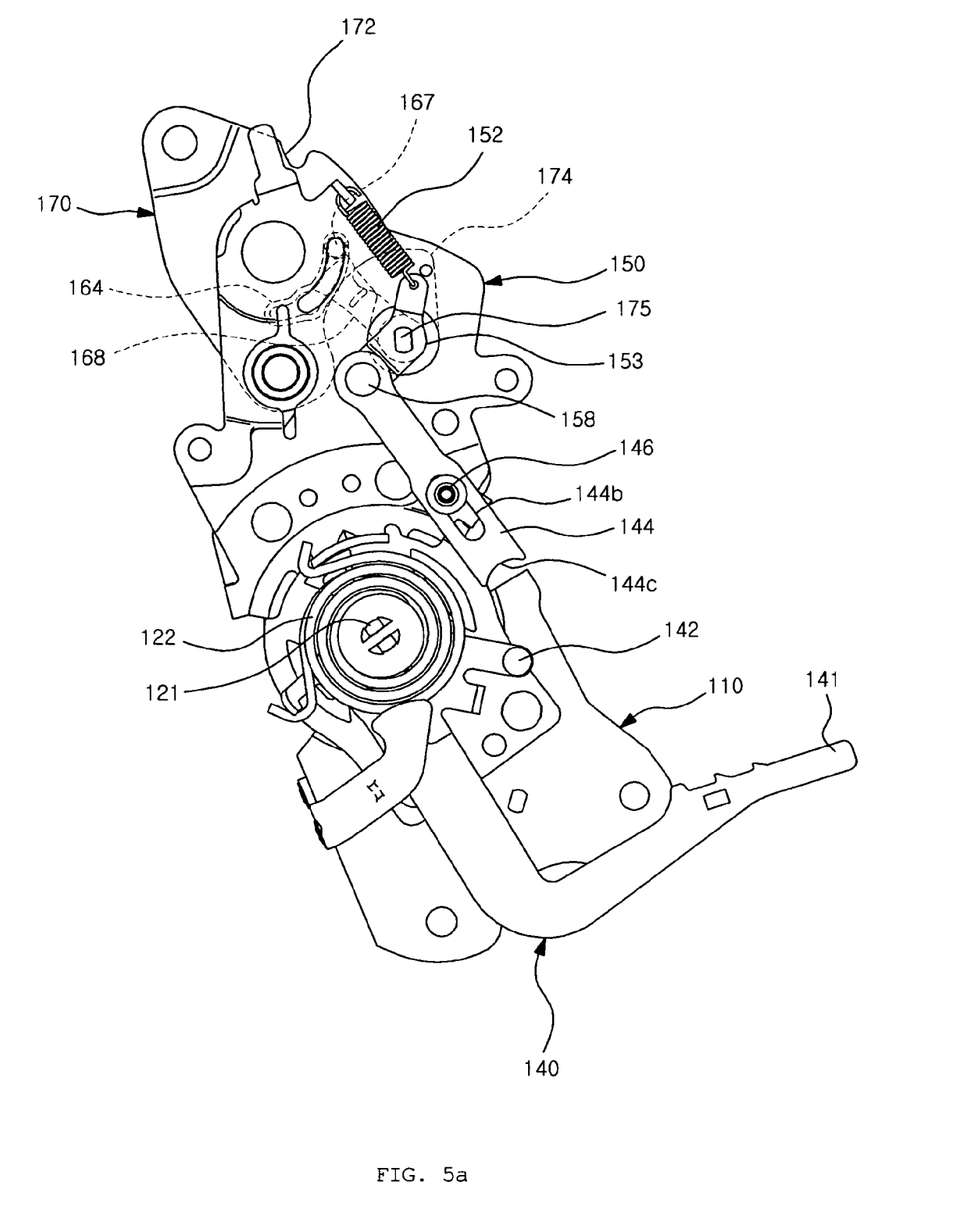
FIGS. 5a through 5d are side views showing a folding motion of the folding recliner of FIG. 2.
Figure 5B:
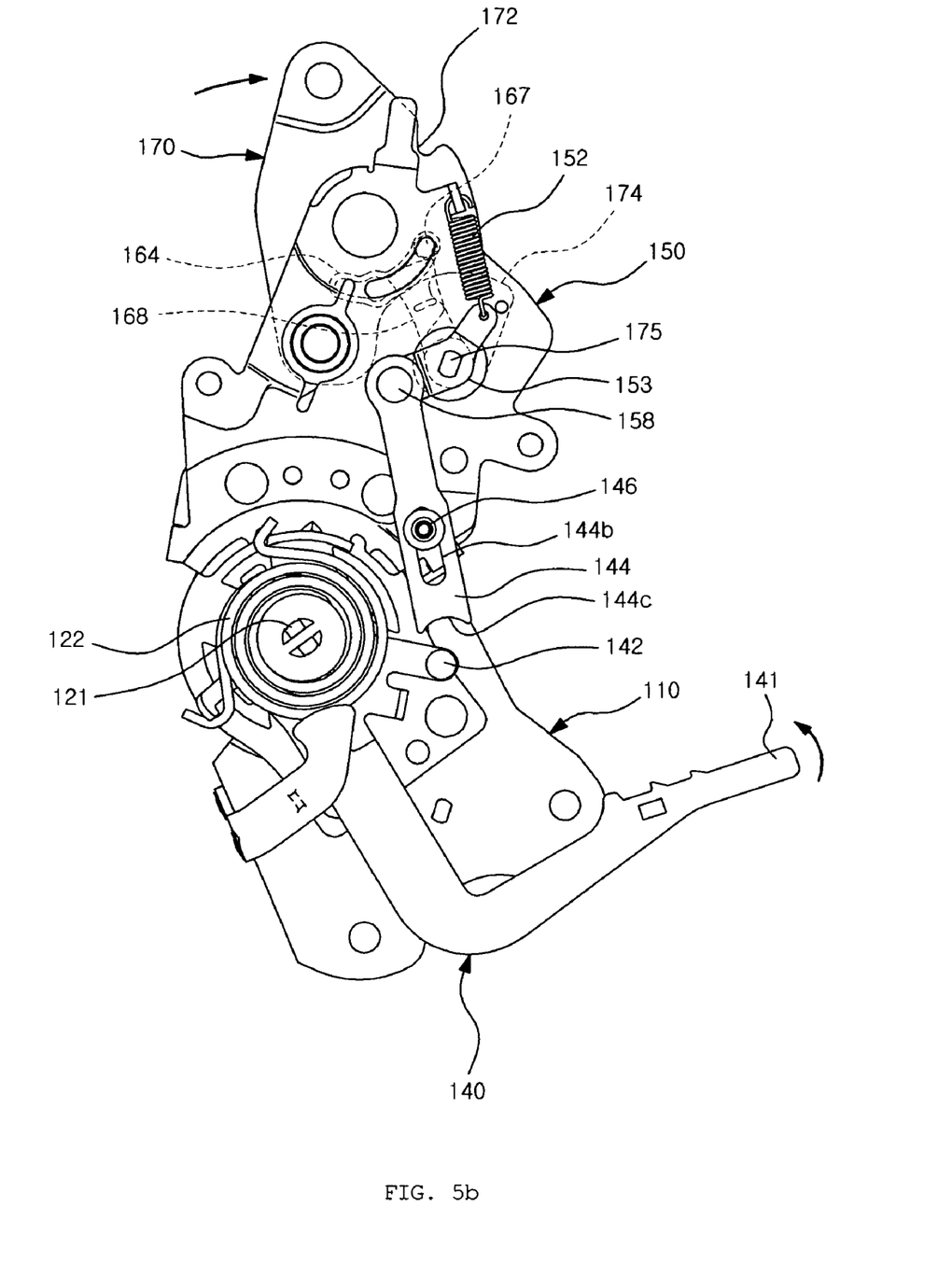
Figure 6A:
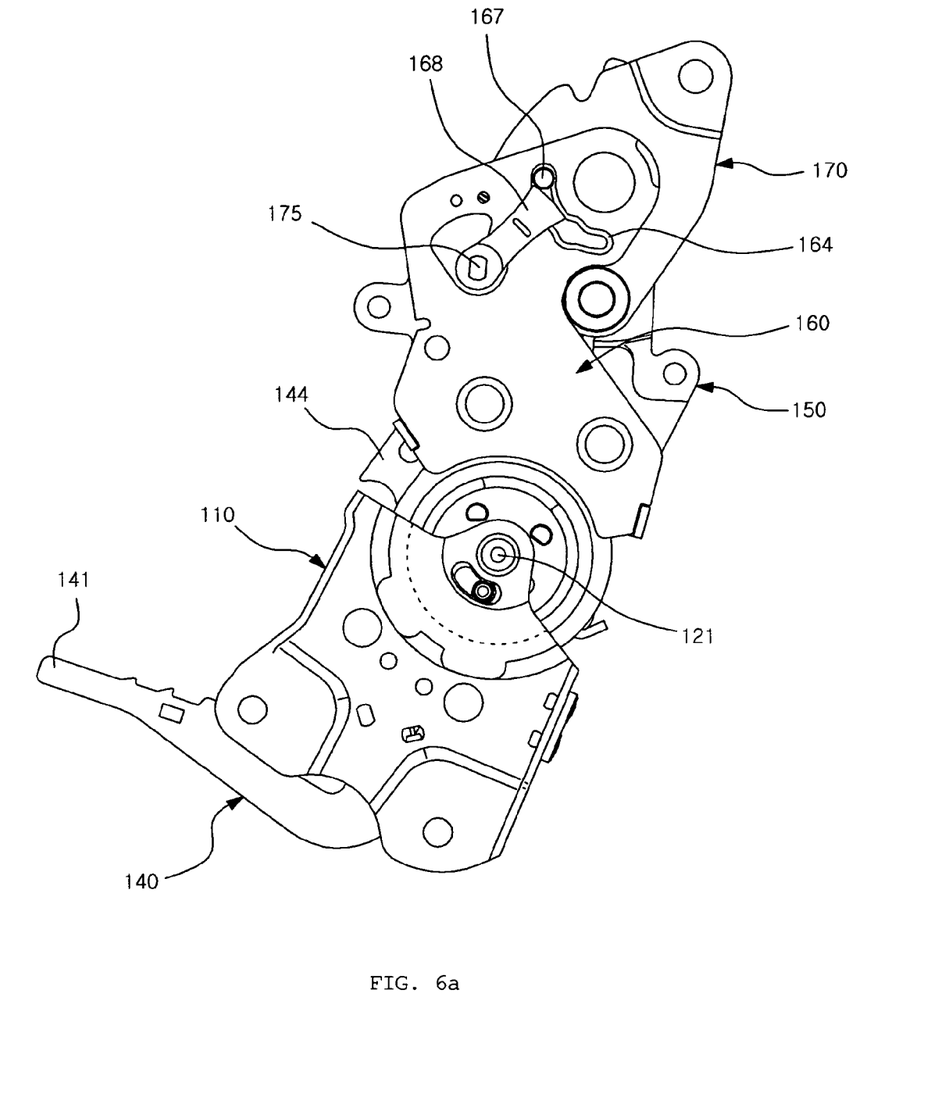
FIGS. 6a and 6b are views showing the opposite side of the folding recliner of FIG. 2.
Figure 6B:
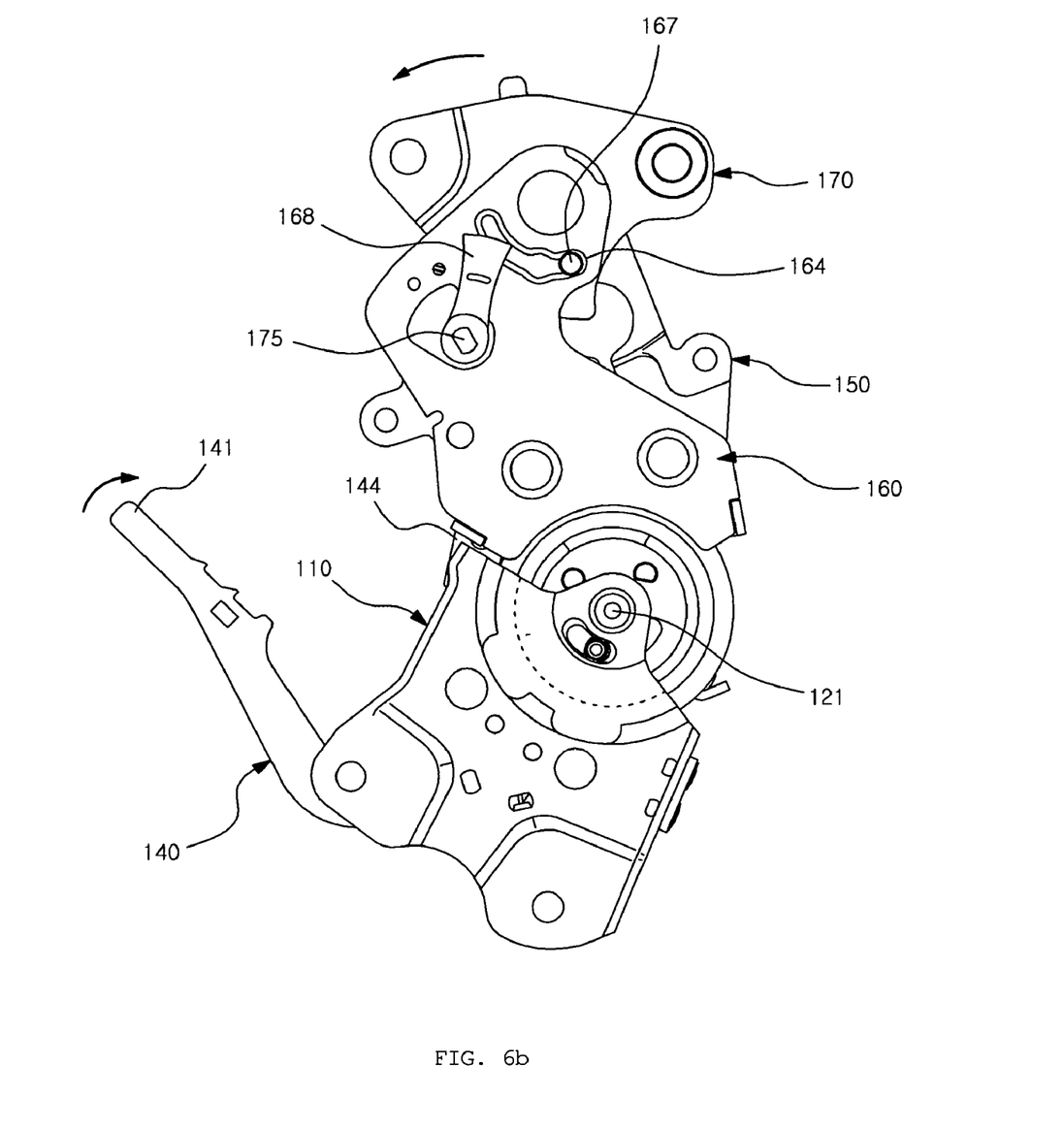

When the lever 141 is rotated from the state in which the folding recliner is locked as shown in FIGS. 5a and 6a, the reclining device is unlocked, as shown in FIG. 5b. Then, the first arm frame 150 is rotated, thereby the seat back is rotated forwards at a predetermined angle while maintaining the reclining unlocked state thereof.

Figure 5C:
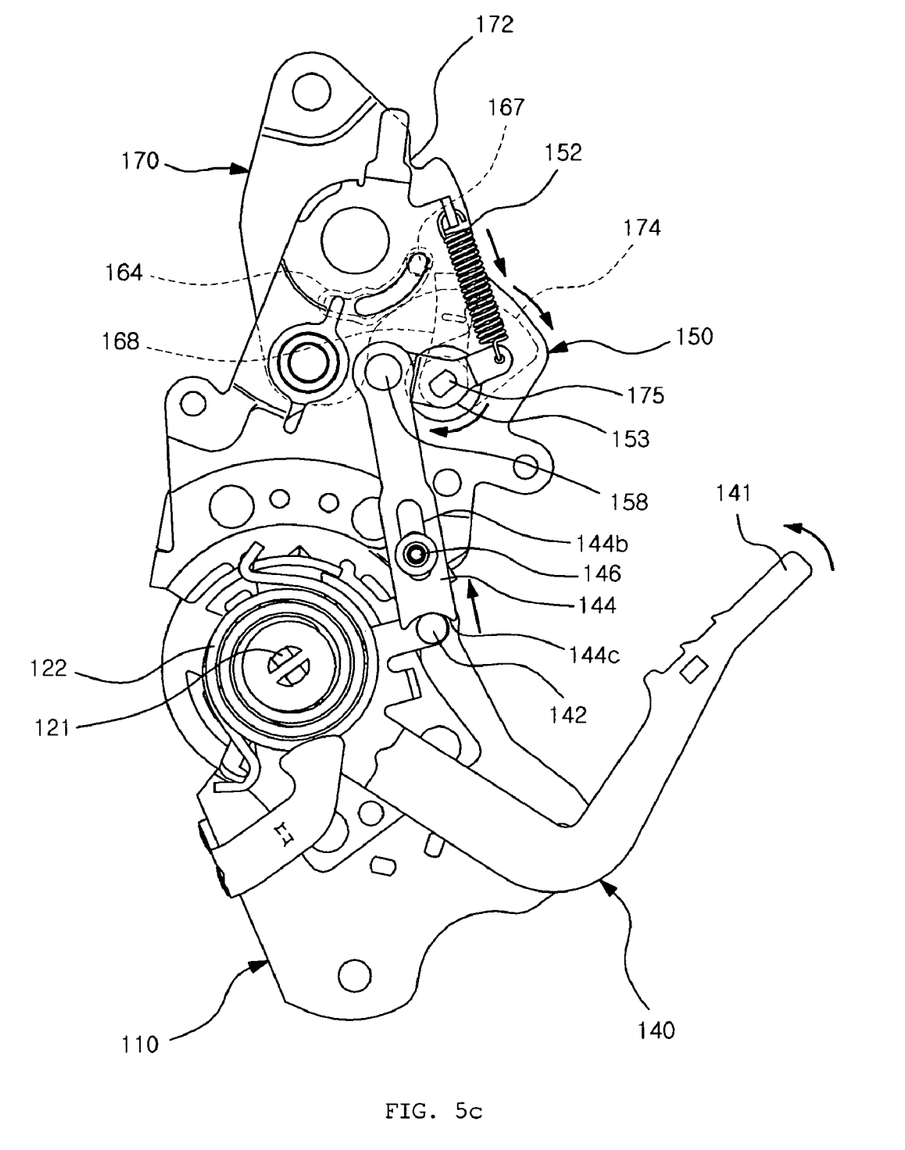

In this state, when the lever 141 is further rotated in the same direction, for example, when the lever 141 is rotated at 26° or more, the lever pin 142 of the lever unit 140 is brought into contact with the contact part 144c of the first link 144 and moves the first link 144 upwards, as shown in FIG. 5c.

As such, when the first link 144 is moved under the guidance of the slot 144b and the slot pin 146, the second link 153, which is hinged to the first link 144 by the rotating pin 158, is rotated around the rotating shaft 175.

Here, because the rotating shaft 175 is fitted into and locked to a fastening hole 153c, which is formed through the second link 153, and both the cam 174 and the stopper link 168 are fitted over and locked to the rotating shaft 175, when the second link 153 is rotated, the cam 174 and the stopper link 168 are also rotated around the rotating shaft 175.

As such, when the rotating shaft 175 is rotated by the manipulation of the lever 141, the upper edge 174c of the cam 174 which has been contacted the curved edge part 176 of the latch 170 is removed from the latch 170. Simultaneously, the stopper link 168, which has been stopped by the latch pin 167 that guides rotation of the latch 170, is also removed from the latch pin 167 and thus releases the latch pin 167. Then, the latch 170 is allowed to be rotated around the folding shaft 173.

Figure 5D:
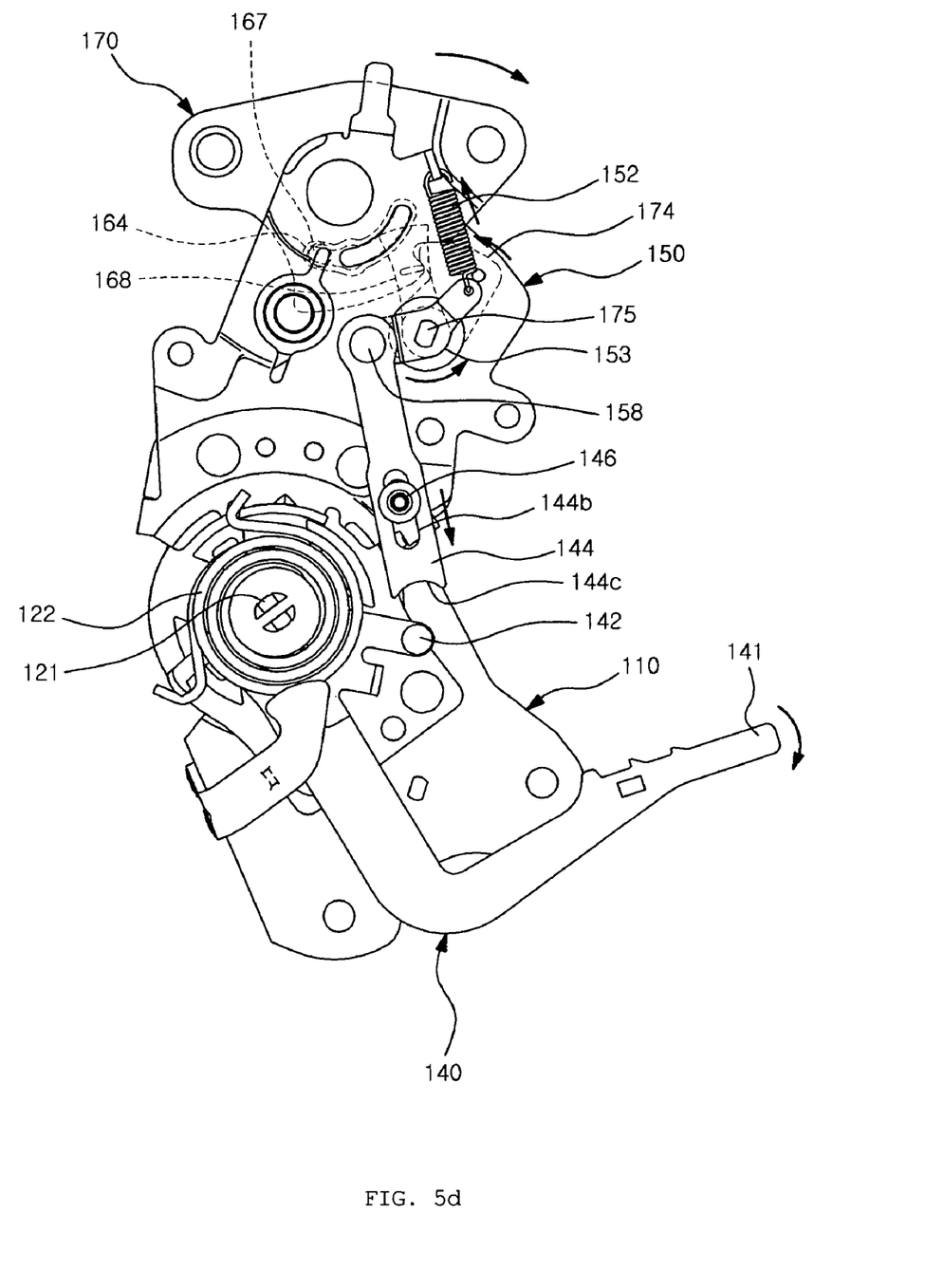

Furthermore, as shown in FIGS. 5d and 6b, after the latch 170 is rotated around the folding shaft 173 so that the seat back is folded, when the lever 141 is released, that is, when the lever 141 is rotated downwards, the lever pin 142 of the lever unit 140 releases the first link 144. Then, the second link 153, which is coupled to the first link 144 and is securely fitted over the rotating shaft 175, is returned to the original position thereof by the restoring force of the spring 152, which is coupled between the second link 153 and the holding hole 151 of the first arm frame 150.

Simultaneously, the cam 174, which is securely fitted over the rotating shaft 175, is also returned to the original position thereof by the restoring force of the spring 152. Then, the locking protrusion 174b of the cam 174 is locked to the locking notch 172 of the latch 170, thus forming a folded locked state.

Although the preferred embodiment of the present invention has been disclosed for illustrative purposes, those skilled in the art will appreciate that various modifications, additions and substitutions are possible, without departing from the scope and spirit of the invention as disclosed in the accompanying claims. Therefore, it must be appreciated that the preferred embodiment is only an example of the present invention, and it should not be interpreted that the invention is limited to the preferred embodiment.

As described above, the present invention provides a folding recliner which can execute seat folding and reclining motions using only a single lever, so that the size of a linking mechanism and the number of elements are reduced, and manufacturing costs thereof are reduced.

Furthermore, a latch pin and a stopper link are provided in an arm frame, so that the folding and reclining motions of the seat back can be separately executed and, as well, a malfunction in folding or reclining the seat back is prevented from being induced.

In addition, because arm frames are provided in a frame unit and a latch is provided between the arm frames in a structure such that the latch can be smoothly rotated, the folding and reclining motions of the seat back are smoothly executed. In particular, the folding motion of the seat back can be stably executed.

As well, an interlocking cable may be coupled to a lever unit such that folding recliners provided on opposite sides of the seat are operated in conjunction with each other.

What is claimed is:

1. A folding recliner for folding and reclining a seat back of a seat of a vehicle, comprising:
    a lever unit, comprising: a lever pin provided at a first position; and a lever provided at a second position, so that, when the lever is rotated in a predetermined direction, the lever unit is rotated around a reclining shaft using a rotational force transmitted from the lever so that the seat back enters an unlocked state;
    a first link provided with a slot formed through an intermediate portion of the first link so that the first link is moved under guidance of a slot pin inserted into the slot, a contact part provided on a lower end of the first link so that a pushing force for an unlocking motion is transmitted from the lever pin of the lever unit, and a through hole formed through an upper end of the first link;
    a second link rotated around a rotating shaft, coupled to an intermediate portion of the second link, by movement of the first link, the second link rotatably coupled at a first end thereof to the through hole of the first link using a rotating pin, with a holding hole formed through a second end of the second link;
    a spring held at a first end thereof by the holding hole of the second link and held at a second end thereof by a frame unit, thus providing a restoring force to the second link so that the seat back enters a locked state;
    a cam rotated around the rotating shaft and having an arm part extending a predetermined length in a predetermined direction, with a locking protrusion provided on an end of the arm part; and
    a latch rotated around a folding shaft, and provided with a curved edge part formed at a first position on an outer edge of the latch so that the curved edge part contacts an upper end of the cam such that the seat back maintains an unfolded locked state thereof, and a locking notch formed at a second position in the outer edge of the latch so that the locking protrusion of the cam is locked to the locking notch such that the seat back maintains a folded locked state thereof.

2. The folding recliner as set forth in claim 1, wherein the frame unit comprises:
    a main frame to which the lever unit is mounted;
    a second arm frame rotatable around the reclining shaft of the main frame and fitted over the folding shaft, and formed with a guide slot formed at a predetermined position through the second arm frame so that a latch pin coupled to the latch moves along the guide slot; and
    a first arm frame provided at a position facing the second arm frame.

3. The folding recliner as set forth in claim 2, further comprising:
    a stopper link provided on the second arm frame and rotated around the rotating shaft, the stopper link limiting movement of the latch pin.

4. The folding recliner as set forth in claim 2, wherein the latch is fitted over the folding shaft between the first arm frame and the second arm frame and rotated around the folding shaft.

* * * * *